(12) United States Patent
Otsuka et al.

(10) Patent No.: US 10,677,124 B2
(45) Date of Patent: *Jun. 9, 2020

(54) EXHAUST PURIFICATION FILTER

(71) Applicant: HONDA MOTOR CO., LTD., Tokyo (JP)

(72) Inventors: Shinichiro Otsuka, Wako (JP); Noritaka Masumitsu, Wako (JP); Ryoko Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 15/762,682

(22) PCT Filed: Sep. 24, 2015

(86) PCT No.: PCT/JP2015/076948
§ 371 (c)(1),
(2) Date: Mar. 23, 2018

(87) PCT Pub. No.: WO2017/051459
PCT Pub. Date: Mar. 30, 2017

(65) Prior Publication Data
US 2018/0266289 A1    Sep. 20, 2018

(51) Int. Cl.
*F01N 3/035* (2006.01)
*F01N 3/022* (2006.01)
(Continued)

(52) U.S. Cl.
CPC ........... *F01N 3/035* (2013.01); *B01D 53/945* (2013.01); *B01D 53/9454* (2013.01);
(Continued)

(58) Field of Classification Search
CPC ............. B01D 53/945; B01D 53/9454; B01D 2255/1023; B01D 2255/1025;
(Continued)

(56) References Cited

U.S. PATENT DOCUMENTS

| 5,898,014 A * | 4/1999 | Wu ........................ B01D 53/945 |
| | | 502/302 |
| 2009/0269253 A1* | 10/2009 | Hachisuka ......... B01D 53/8615 |
| | | 422/169 |

(Continued)

FOREIGN PATENT DOCUMENTS

| CN | 101939097 A | 1/2011 |
| CN | 102333579 A | 1/2012 |

(Continued)

OTHER PUBLICATIONS

Japanese Office Action Notification of Reasons for Refusal issued in JP Patent Application No. JP2017-541198, dated Jan. 8, 2019.

(Continued)

*Primary Examiner* — Brandon D Lee
(74) *Attorney, Agent, or Firm* — Squire Patton Boggs (US) LLP

(57) ABSTRACT

Provided is a GPF capable of exhibiting better than conventional three-way purification function. A gasoline particulate filter (GPF) that is provided in an exhaust pipe of an engine and that performs purification by capturing particulate matter (PM) in exhaust gas is provided with a filter substrate in which a plurality of cells extending from an exhaust gas inflow-side end face to an outflow-side end face are defined by porous partition walls and in which openings at the inflow-side end face and openings at the outflow-side end face of the cells are alternately sealed; and a three-way catalyst (TWC) supported by the partition wall. The three-way catalyst is the GPF comprising a catalytic metal containing at least Rh, and a composite oxide having an oxygen storage capacity and containing Nd and Pr in a crystal structure.

9 Claims, 12 Drawing Sheets

(51) Int. Cl.
   *F01N 3/10* (2006.01)
   *B01D 53/94* (2006.01)
   *B01J 29/06* (2006.01)
   *B01J 29/068* (2006.01)

(52) U.S. Cl.
   CPC .......... *B01J 29/061* (2013.01); *B01J 29/068* (2013.01); *F01N 3/0222* (2013.01); *F01N 3/101* (2013.01); *B01D 2255/1023* (2013.01); *B01D 2255/1025* (2013.01); *B01D 2255/2065* (2013.01); *B01D 2255/2066* (2013.01); *B01D 2255/2068* (2013.01); *B01D 2255/20715* (2013.01); *B01D 2255/407* (2013.01); *B01D 2255/908* (2013.01); *B01D 2255/9155* (2013.01); *B01D 2258/014* (2013.01); *F01N 2250/02* (2013.01); *F01N 2330/06* (2013.01); *F01N 2330/30* (2013.01); *F01N 2370/02* (2013.01); *F01N 2370/04* (2013.01); *F01N 2510/06* (2013.01); *Y02T 10/22* (2013.01)

(58) Field of Classification Search
   CPC .... B01D 2255/2065; B01D 2255/2066; B01D 2255/2068; B01D 2255/20715; B01D 2255/407; B01D 2255/908; B01D 2255/9155; B01D 2258/014; B01J 29/061; B01J 29/068; F01N 3/0222; F01N 3/035; F01N 3/101; F01N 2250/02; F01N 2330/06; F01N 2330/30; F01N 2370/02; F01N 2370/04; F01N 2510/06; Y02T 10/22
   See application file for complete search history.

(56) References Cited

U.S. PATENT DOCUMENTS

| | | | |
|---|---|---|---|
| 2010/0205936 A1 | 8/2010 | Suzuki et al. | |
| 2010/0300078 A1 | 12/2010 | Lu et al. | |
| 2011/0030346 A1 | 2/2011 | Neubauer et al. | |
| 2011/0219746 A1 | 9/2011 | Yezerets et al. | |
| 2011/0236282 A1 | 9/2011 | Southward et al. | |
| 2011/0252773 A1* | 10/2011 | Arnold | B01D 46/2429 60/297 |
| 2014/0044626 A1 | 2/2014 | Greenwell | |
| 2014/0050626 A1 | 2/2014 | Heidenreich | |
| 2014/0234188 A1 | 8/2014 | Hartland | |
| 2015/0240678 A1 | 8/2015 | Aoyama et al. | |

FOREIGN PATENT DOCUMENTS

| | | |
|---|---|---|
| CN | 102781572 A | 11/2012 |
| CN | 104254387 A | 12/2014 |
| JP | 2006-233935 A | 9/2006 |
| JP | 2006-297259 A | 11/2006 |
| JP | 2007-192055 A | 8/2007 |
| JP | 2008-121602 A | 5/2008 |
| JP | 2009-068341 A | 4/2009 |
| JP | 2010-048131 A | 3/2010 |
| JP | 2010264359 A | 11/2010 |
| JP | 2011525856 A | 9/2011 |
| JP | 2013-500857 A | 1/2013 |
| JP | 2013523419 A | 6/2013 |
| JP | 2014000516 A | 1/2014 |
| JP | 2014-039925 A | 3/2014 |
| JP | 2014-100662 A | 6/2014 |
| JP | 2014-136174 A | 7/2014 |
| JP | 2014-148924 A | 8/2014 |
| JP | 2015-521245 A | 7/2015 |
| JP | 2015-157257 A | 9/2015 |
| JP | 2015157236 A | 9/2015 |
| WO | 2009/158009 A1 | 12/2009 |

OTHER PUBLICATIONS

Aug. 1, 2019 Office Action issued in Chinese Patent Application No. 201580083322.X.

International Search Report & Written Opinion dated Dec. 1, 2015 corresponding to International Patent Application No. PCT/JP2015/076948, and English translation thereof.

May 14, 2019 Notification of Reasons for Refusal issued in Japanese Patent Application No. 2017-541198.

International Search Report and Written Opinion issued in corresponding International Patent Application No. PCT/JP2015/076947, dated Dec. 1, 2015.

Decision of Refusal issued in corresponding Japanese Patent Application No. 2017-541198, dated Feb. 4, 2020.

* cited by examiner

EXHAUST PURIFICATION FILTER

TECHNICAL FIELD

The present invention relates to an exhaust purification filter equipped with a three-way catalyst.

BACKGROUND ART

Conventionally, in the gasoline engines equipped to automobiles, etc., direct injection gasoline engines have been employed from the viewpoint of improvements in fuel economy, etc. However, since particular matter (hereinafter referred to as "PM") is generated by these direct injection gasoline engines, research into technology providing an exhaust purification filter (Gasoline Particulate Filter (hereinafter referred to as "GPF") which captures PM in the exhaust passage of a gasoline engine has been progressing, accompanying the strengthening of emission laws in recent years.

In addition, a three-way catalyst (hereinafter referred to as "TWC") which purifies CO, HC and NOx contained in exhaust gas is provided in a state loaded on a honeycomb carrier, in the exhaust passage of a gasoline engine. Particularly in recent years, a plurality of TWCs has been arranged in series in the exhaust passage in order to satisfy the required purification performance. For this reason, in addition to this plurality of TWCs, it is preferable to newly provide a GPF in the exhaust passage from the viewpoint of pressure loss and cost.

Therefore, technology has been proposed which loads TWC on the GPF to impart the three-way purification function to the GPF in addition to the PM capturing function (for example, refer to Patent Document 1). According to this technology, it is said to be possible to overcome the problems in pressure loss and cost, by integrating the GPF and TWC.

Patent Document 1: Japanese Unexamined Patent Application (Translation of PCT Application), Publication No. 2013-50085

DISCLOSURE OF THE INVENTION

Problems to be Solved by the Invention

However, with the technology of Patent Document 1, in the case of using a three-way catalyst containing Rh as the catalytic metal, particularly the NOx purification performance may greatly decline. For example, although a TWC having a two-layer structure of Rh layer and Pd layer has been known as a TWC having superior three-way purification performance, since it leads to great pressure loss when loading this TWC onto the GPF, it has been considered to mix the Rh and Pd, and then load onto the GPF. However, in this case, the Ba usually added to the Pd layer for Pd deterioration suppression and improvement in NOx absorbability will be in contact or near the Rh. When this is done, the Rh will be oxidized by the electron-donating action of Ba to form an oxide, and the NOx reducability of Rh declines, a result of which there has been a problem in that the NOx purification performance greatly declines.

The present invention has been made taking account of the above, and an object thereof is to provide a GPF capable of exhibiting more superior three-way purification performance than conventionally.

Means for Solving the Problems

In order to achieve the above-mentioned object, a first aspect of the present invention provides an exhaust purification filter (for example, the GPF 32 described later) which is provided in an exhaust passage (for example, the exhaust pipe 3 described later) of an internal combustion engine (for example, the engine 1 described later), and purifies by capturing particulate matter (PM) in exhaust gas of the internal combustion engine, the exhaust purification filter including: a filter substrate (for example, the filter substrate 320 described later) in which a plurality of cells (for example, the inlet-side cells 321, outlet-side cells 322 described later) extending from an inlet-side end face (for example, the inlet-side end face 32a described later) until an outlet-side end face (for example, the outlet-side end face 32b described later) of exhaust gas are formed to be divided by porous barrier walls (for example, the barrier wall 323 described later), and an opening at the inlet-side end face and an opening at the outlet-side end face of the cells are alternately sealed; and a three-way catalyst (for example, the TWC 33 described later) that is loaded on the barrier walls, in which the three-way catalyst is configured to include a catalytic metal containing at least Rh, and a complex oxide having an oxygen occlusion/release ability and having Nd and Pr in the crystalline structure thereof.

In the first aspect of the invention, in the so-called wall-flow type GPF, the three-way catalyst loaded on the barrier wall is configured to include a catalytic metal at least containing Rh, and a complex oxide having oxygen occlusion/release ability and having Nd and Pr in the crystalline structure. Herein, among elements capable of being incorporated in the crystalline structure of the complex oxide having oxygen occlusion/release ability (Oxygen Storage Capacity, hereinafter referred to as "OSC")), Nd and Pr have a characteristic of a large amount of acid sites, as described in detail later. For this reason, the complex oxide having Nd and Pr in the crystalline structure has high HC absorbability due to the large amount of acid sites, and thus the steam-reforming reaction which progresses under the existence of HC and water, advances efficiently. Given this, hydrogen is generated by the advancement of this steam-reforming reaction, and the oxide formation of Rh constituting the TWC is suppressed by the generated hydrogen. In other words, since it is possible to avoid a decline in the NOx reducibility of Rh, high NOx purification performance can be exhibited. Therefore, the present invention can provide the GPF which can exhibit a more superior three-way purification function than conventionally. In addition, as described in detail later, the generated amount of hydrogen by the steam-reforming reaction is higher for Nd than Pr; however, Pr has an effect of absorbing fluctuations in air/fuel ratio. Therefore, by using the complex oxide having Nd and Pr in the crystalline structure according to the present invention, it is possible to exhibit high three-way purification function while suppressing fluctuations in the air/fuel ratio.

According to a second aspect of the present invention, in the first aspect, it is preferable for the barrier wall to have an average pore diameter of at least 15 μm, and the three-way catalyst to have a particle size D90 when a cumulative distribution from a small particle size side of the particle distribution is 90% of no more than 5 μm.

In addition, the second aspect of the invention micronizes to make the average pore diameter of the barrier wall at least 15 μm, and make the particle size D90 of the TWC no more than 5 μm. It is thereby possible to introduce the micronized TWC within the pores of the barrier wall, and possible to load the TWC on the surfaces inside such pores. Therefore, according to the present invention, it is possible to avoid an increase in the pressure loss of the GPF occurring from the TWC being loaded only on the surface of the barrier wall, and moreover, possible to exhibit higher three-way purification function.

According to a third aspect of the present invention, in the first or second aspect, it is preferable for the three-way catalyst to contain Rh and Pd as the catalytic metal, and to be loaded onto surfaces within pores inside of the barrier wall in a state in which the Rh and Pd are mixed.

With the third aspect of the present invention, the three-way catalyst is configured to contain Rh and Pd, and is loaded onto the surfaces inside the pores within the barrier wall in a state mixing this Rh and Pd. Conventionally, in the case of mixing Rh and Pd on the GPF as mentioned above, as a result of Ba added to the conventional Pd layer either contacting or being near Rh, the Rh is oxidized to form an oxide by the electron donating action of Ba, whereby the NOx purification performance greatly declines. In contrast, according to the present invention, as a result of the effects of the first aspect of the invention being remarkably exhibited, it is possible to avoid a decline in the NOx purification performance of Rh, and thus possible to provide the GPF that can exhibit more superior three-way purification function than conventionally. In addition, since it is difficult to load conventional TWC having a two-layer structure of the Rh layer and Pd layer on the surfaces inside the pores of the barrier wall, and further, high three-way purification function is exhibited in the state mixing Rh and Pd according to the present invention, it becomes a catalyst composition preferred in the loading onto the surfaces within pores of the barrier wall.

According to a fourth aspect of the present invention, in any one of the first to third aspects, it is preferable for the three-way catalyst to be configured to be free of Ba.

With the fourth aspect of the present invention, the three-way catalyst is configured to be free of Ba. According to the present invention, since Ba is not contained in the TWC, it is possible to avoid oxide formation of Rh from being advanced by Ba and the NOx purification performance declining as mentioned above.

According to a fifth aspect of the present invention, in any one of the first to fourth aspects, it is preferable for total content of Nd and Pr contained in the complex oxide to be at least 10% by mass.

With the fifth aspect of the present invention, a configuration is established in which Nd and Pr are contained in at least 10% by mass in the crystalline structure of the complex oxide. According to the present invention, more superior three-way purification performance is exhibited.

Effects of the Invention

According to the present invention, it is possible to provide a GPF capable of exhibiting more superior three-way purification function than conventionally.

PREFERRED MODE FOR CARRYING OUT THE INVENTION

Hereinafter, an embodiment of the present invention will be explained by referencing the drawings.

Figure 1:
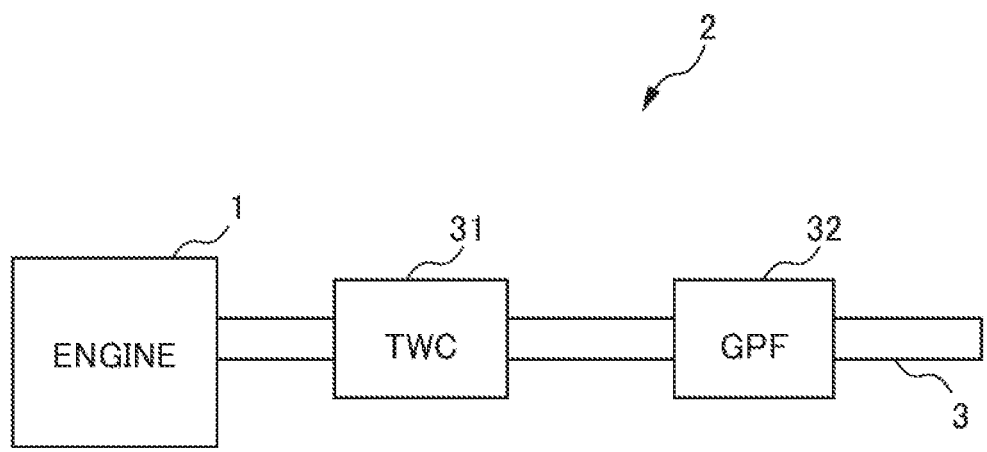
FIG. 1 is a view showing the configuration of an exhaust purification device of an internal combustion engine according to an embodiment of the present invention.

FIG. 1 is a view showing the configuration of an exhaust purification device 2 of an internal combustion engine (hereinafter referred to as "engine") 1 according to the present embodiment. The engine 1 is a direct injection-type gasoline engine. As shown in FIG. 1, the exhaust purification device 2 includes a TWC 31 and GPF 32 provided in order from the upstream side of an exhaust pipe 3 in which exhaust gas flows.

The TWC 31 purifies by oxidizing or reducing HC in the exhaust gas into $H_2O$ and $CO_2$, CO into $CO_2$, NOx into $N_2$, respectively. For the TWC 31, for example, one made by loading noble metal such as Pd, Rh, etc. as catalytic metals onto a carrier consisting of oxide such as alumina, silica, zirconia, titania, ceria or zeolite has been used. This TWC 31 is normally loaded onto a honeycomb support.

In addition, the TWC 31 includes an OSC material having OSC ability. As the OSC material, other than $CeO_2$, a complex oxide of $CeO_2$ and $ZrO_2$ (hereinafter referred to as "CeZr complex oxide") or the like has been used. Thereamong, CeZr complex oxide is preferably used due to having high durability. It should be noted that the above-mentioned catalytic metals may be loaded on these OSC materials.

The preparation method of the TWC 31 is not particularly limited, and is prepared by the conventionally known slurry method, or the like. For example, it is prepared by preparing a slurry containing the above-mentioned oxide, noble metal, OSC material, etc., followed by coating the prepared slurry onto a honeycomb support made of cordierite and firing.

The GPF 32 purifies by capturing PM in the exhaust gas. More specifically, upon exhaust gas passing through the fine pores in the barrier walls described later, PM is captured by the PM depositing on the surfaces of the barrier walls.

Figure 2:
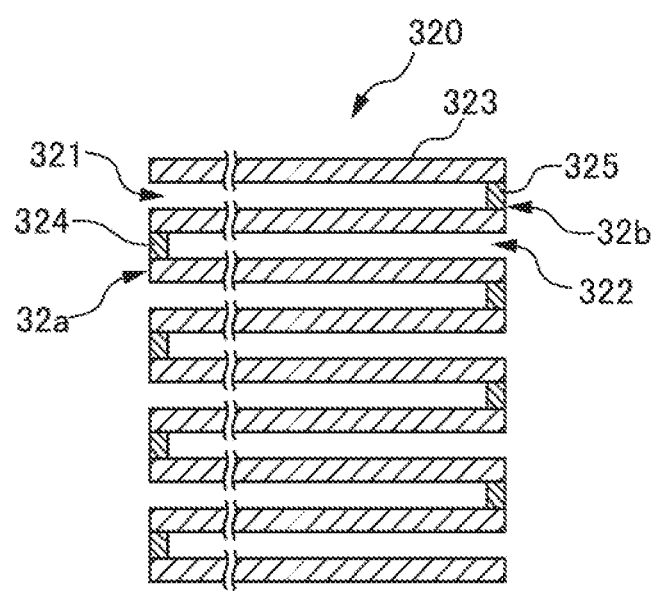
FIG. 2 is a cross-sectional schematic drawing of a GPF according to the embodiment.

FIG. 2 is a cross-sectional schematic diagram of the GPF 32 according to the present embodiment. As shown in FIG. 2, the GPF 32 includes a filter substrate 320. The filter substrate 320 is a columnar shape that is long in the axial direction, for example, and is formed from a porous body such as cordierite, mullite, silicon carbide (SiC) or the like. A plurality of cells extending from the inlet-side end face 32a to the outlet-side end face 32b is provided in the filter substrate 320, and these cells are formed to be divided by barrier walls 323.

The filter substrate 320 includes inlet-side sealed parts 324 which seal the inlet-side end face 32a. The cells in which the inlet-side end face 32a is sealed by the inlet-side sealing part 324 constitute outlet-side cells 322 in which the inlet-side end face is closed, while the outlet-side end is opened, and exhaust gas having passed through the barrier wall 323 flows out to downstream. The inlet-side sealing parts 324 are formed by filling sealing cement from the inlet-side end face 32a of the filter substrate 320.

The filter substrate 320 includes outlet-side sealing parts 325 which seal the outlet-side end face 32b. The cells in which the outlet-side end face 32b is sealed by the outlet-side sealing part 325 constitute inlet-side cells 321 in which the inlet-side end is opened, while the outlet-side end is closed, and exhaust gas flows in from the exhaust pipe 3. The outlet-side sealing parts 325 are formed by filling sealing cement from the outlet-side end face 32b of the filter substrate 320.

It should be noted that the opening on the inlet-side end face 32a of a cell and the opening on the outlet-side end face 32b are alternately sealed, whereby the above-mentioned inlet-side cells 321 and outlet-side cells 322 will be arranged adjacently in a lattice shape (checkered pattern) to each other.

Figure 3:
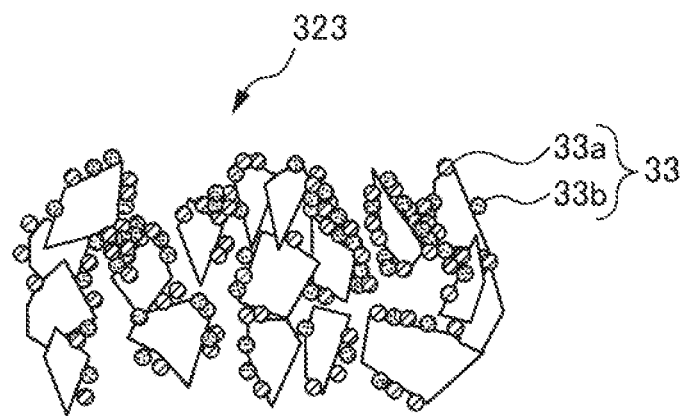
FIG. 3 is an enlarged schematic drawing of a barrier wall of the GPF according to the embodiment.

FIG. 3 is an enlarged schematic diagram of the barrier wall 323 of the GPF 32 according to the present embodiment. As shown in FIG. 3, the TWC 33 is loaded on the inner surface of pores within the barrier wall 323. The TWC 33 is configured to include a TWC 33a containing Rh and a TWC 33b containing Pd. These TWCs 33 are loaded on the surfaces inside pores in an atomized state. It should be noted that the pores of the barrier wall 323 are not blocked by these TWCs 33, and are made so that a large pressure loss does not occur.

The barrier wall 323 preferably has an average pore diameter of at least 15 µm. So long as the average pore diameter is at least 15 µm, with relation to the particle size of the TWC 33 described later, it is possible for the TWC 33 to penetrate inside the pore diameter, and thus the TWC 33 can be loaded on the surfaces inside of the pores. A more preferable average pore diameter is at least 20 µm.

In addition, although the thickness of the barrier wall 323 is not particularly limited, it is preferably no more than 10 mil. In the case of the thickness of the barrier wall exceeding 10 mil, the pressure loss may increase in relation to the loading amount of TWC and average pore diameter of the barrier wall, etc.

The TWC 33 is atomized to have a particle size D90 of no more than 5 µm when the cumulative probability distribution from the small grain size side of the grain distribution reaches 90%. So long as the D90 of TWC 33 is no more than 5 µm, with relation to the average pore diameter of the aforementioned barrier wall 323, it is possible for the TWC 33 to penetrate into the pore diameter, whereby the TWC 33 can be loaded on the surfaces inside the pores. A more preferably D90 is no more than 3 µm.

The TWC 33 contains at least Rh as the catalytic metal, and preferably contains Rh and Pd as the catalytic metal as shown in FIG. 3. This Rh and Pd may be loaded on a complex oxide having the OSC ability described later, and may be loaded onto a conventionally known carrier consisting of oxides such as alumina, silica, zirconia, titania, ceria and zeolites.

The TWC 33 is configured to include the TWC 33a containing Rh and the TWC 33b containing Pd as mentioned above. As shown in FIG. 3, the TWC 33a containing Rh and the TWC 33b containing Pd are loaded onto the surfaces inside of the pores within the barrier wall 323 in a mixed state.

In addition, the TWC 33 includes a complex oxide having OSC ability and having Nd and Pr in the crystalline structure.

In the present embodiment, the complex oxide used as the OSC material along with the catalytic metal is loaded into the barrier wall 323. The TWC has a function of oxidizing HC in the exhaust gas to convert to $CO_2$ and $H_2O$, oxidizing the CO to convert to $CO_2$, while reducing the $NO_x$ to $N_2$. In order to effectively produce the catalytic actions in both of these reactions simultaneously, it is preferable to keep the ratio of fuel to air (hereinafter referred to as "air/fuel ratio") close to a theoretical mixture ratio (hereinafter referred to as "stoichiometric ratio").

The air/fuel ratio in the internal combustion engine of an automobile or the like greatly fluctuates according to the operating conditions, and thus is controlled so as to keep the air/fuel ratio in the vicinity of the stoichiometric ratio using an oxygen sensor. However, it is not sufficient for the catalyst to exhibit purification performance by simply controlling the air/fuel ratio by such a method. Therefore, the OSC material having an oxygen occlusion/release ability of occluding oxygen under an oxidizing atmosphere and releasing oxygen under a reducing atmosphere is used along with the catalytic metal as a co-catalyst. For example, $CeO_2$, a complex oxide of Ce and Zr, or the like are known as OSC materials.

In the complex oxide used as the OSC material in the present embodiment, a structure is assumed in which a part of the Ce and/or Zr in the crystalline structure of $CeO_2$ and/or $ZrO_2$ is substituted with Nd, Pr. Nd and Pr have high HC absorbability, and the generated amount of hydrogen by way of the steam-reforming reaction described later is great. The hydrogen promotes reduction of Rh, and raises the $NO_x$ purification performance of Rh.

In the present embodiment, in addition to Nd, the Pr which has a smaller generated amount of hydrogen by way of the steam reforming reaction than Nd, is also contained in the structure of the complex oxide. Since Pr has a function of absorbing the fluctuations in the air/fuel ratio relative to a stoichiometric ratio, it facilitates the air/fuel ratio being kept near a stoichiometric ratio by Pr being contained.

The CeZrNdPr complex oxide according to the present embodiment can be prepared by the following method, for example. First, cerium nitrate, zirconium nitrate, neodymium nitrate and praseodymium nitrate are dissolved in purified water so as to make the desired ratios. Subsequently, a precipitate is obtained by adding drop-wise a sodium hydroxide aqueous solution to make the pH of the solvent to be 10, for example. Subsequently, the solvent is evaporated by vacuum filtrating in a state heating the solution containing the precipitate to 60° C., for example. Next, after extracting residue, the CeZrNdPr complex oxide is obtained by performing calcination for 2 hours at 500° C., for example.

In addition, the TWC 33 of the present embodiment is configured to be free of Ba, which had been conventionally added from the viewpoint of Pd deterioration suppression and improvement in NOx absorbability.

In the TWC 33 of the present embodiment, the total content of Nd and Pr contained in the complex oxide is preferably at least 10% by mass. So long as the total content of Nd and Pr contained in the complex oxide is within this range, higher three-way purification function will be exhibited. The upper limit for this total content is preferably 20% by mass, and a more preferable range is 12% by mass to 16% by mass.

The content ratio of Rh to Pd in the TWC 33 is not particularly limited; however, it is preferably Rh:Pd=1: 10~1:5 by mass basis.

In addition, the washcoat amount of TWC 33 is not particularly limited; however, it is preferably 40 to 80 g/L. In the case of the washcoat amount being less than 40 g/L, sufficient purification performance will not be obtained, and in the case of exceeding 80 g/L, the pressure loss will increase.

It should be noted that, in the present embodiment, another noble metal, e.g. Pt, may be contained as a catalytic metal in the TWC 33. In addition, catalysts having functions other than the three-way purification function, e.g., NOx catalyst or oxidation catalyst, Ag-based catalyst for combustive removal of PM deposited in the GPF, and the like may be loaded within the barrier wall or on the barrier wall surface.

Next, the production method of the GPF 32 according to the present embodiment will be explained. The GPF 32 according to the present embodiment is produced by a dipping method, for example. With the dipping method, for example, a slurry containing predetermined amounts of the constituent materials of the TWC 33 is created by wet pulverization or the like, the GPF 32 is immersed in the created slurry, followed by pulling the GPF 32 out and firing at predetermined temperature conditions, whereby it is possible to load the TWC 33 on the GPF 32.

In the present embodiment, it is preferable to pulverize the slurry created by mixing catalysts such as Rh and Pd in a ball mill or the like until the particle size is no more than 5 μm, and then immerse the GPF 32 one time. It is thereby possible to load Rh and Pd in a state randomly mixed on the surfaces inside of pores within the barrier wall 323.

Figure 4:
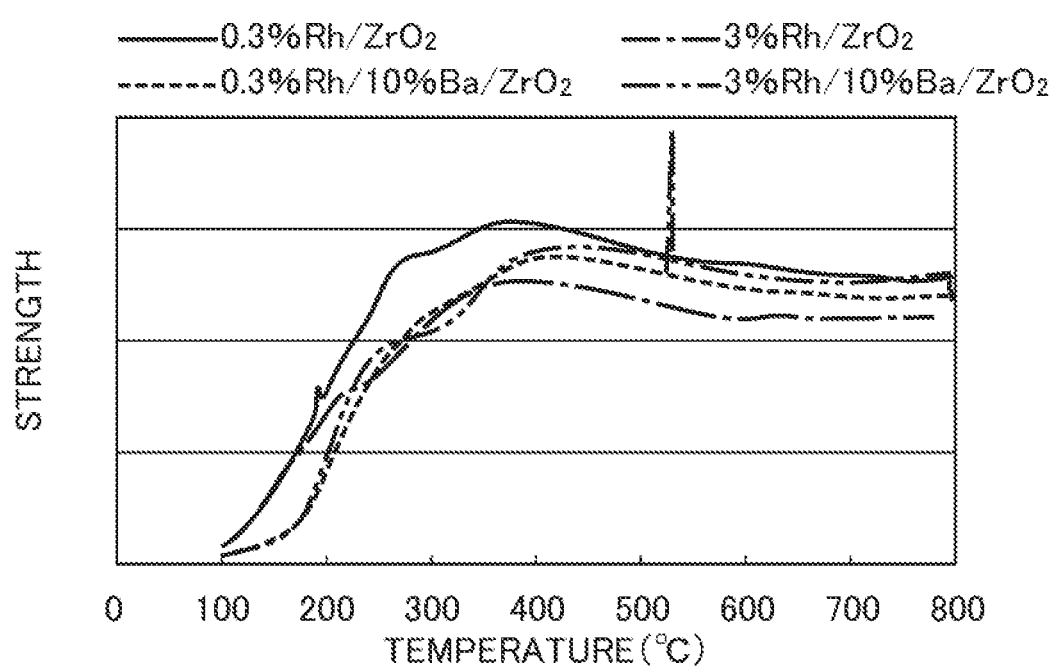
FIG. 4 is a graph showing the ease of reduction of Rh by way of CO-TPR.

Next, the reason for the TWC according to the present embodiment not containing Ba being preferable will be explained by referencing FIG. 4. FIG. 4 is a graph showing the ease of reducing Rh by CO-TPR. More specifically, it is a graph showing the results of measuring the ease of reducing Rh by way of CO-TPR (temperature-programed-reduction technique) according to the following sequence, due to the existence/absence of Ba added to the TWC. TWCs were measured which had been created by loading Rh onto Zr oxide in proportions of 0.3% by mass and 3% by mass, respectively, and adding 10% by mass of Ba thereto, or not adding thereto.

(CO-TPR Measurement Sequence)
(1) Heat in He, and hold at 600° C. for 10 minutes
(2) Lower temperature to 100° C.
(3) Heat in 1% $CO/N_2$ up to 800° C. at 10° C./min, and reduce Rh
(4) Lower temperature to 600° C.
(5) Hold in 10% $O_2/N_2$ at 600° C. for 10 minutes
(6) Lower temperature to 100° C., hold in He for 10 minutes, followed by holding in 1% CO/Ne for 10 minutes
(7) Heat to 800° C. at 10° C./min in 1% $CO/N_2$, and measure change due to temperature in $CO_2$ release As shown in FIG. 4, it is understood that the TWC containing Ba has a small $CO_2$ release amount at low temperature compared to TWC free of Ba. This is considered to mean that Rh is hardly reduced, and Ba inhibits the reduction of Rh. Therefore, the TWC of the present embodiment maintains the reduced state of Rh by not containing Ba, and thus high $NO_x$ purification performance is exhibited.

Figure 5:
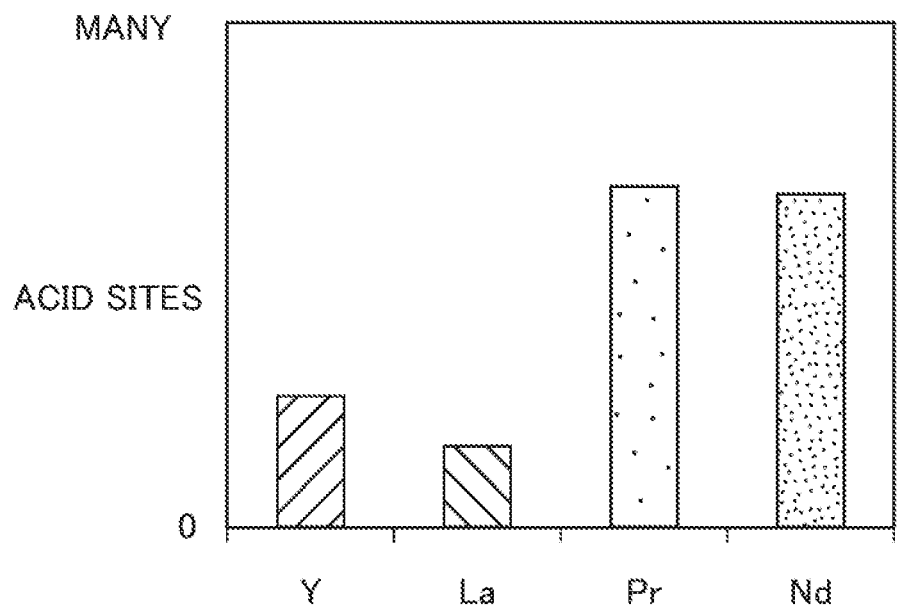
FIG. 5 is a chart showing the amount of acid sites for each complex oxide according to NH3-TPD.

Next, the actions according to the CeZrNdPr complex oxide will be explained. For the Rh used as the catalytic metal, the reduced state is maintained under the presence of hydrogen, whereby the $NO_x$ purification performance rises. For this reason, in the present embodiment, the steam reforming reaction is employed. The steam reforming reaction is a reaction such as the following equation in which steam and HC react at high temperature under the presence of catalyst and hydrogen is produced. $C_nH_m+nH_2O \rightarrow nCO+(n+1/2m)h_2$ In order to raise the generated amount of hydrogen by the steam reforming reaction, HC absorbability is important, and the HC absorbability is considered to depend on the acid sites. FIG. 5 is a graph showing the amount of acid sites of each complex oxide according to $NH_3$-TPD. More specifically, it is a graph showing the results of measuring the amounts of the acid sites for Y, La, Pr and Nd, respectively, which are exemplified as elements which can be contained in the crystalline structure of the complex oxides of Ce and/or Zr, by way of the following sequence by $NH_3$-TPD (temperature-programmed-reduction technique).

($NH_3$-TPD Measurement Sequence)
(1) Heat in He, and hold at 600° C. for 60 minutes
(2) Lower temperature to 100° C.
(3) After holding for 60 minutes in 0.1% NH3/He, hold for 60 minutes in He
(4) Heat to 600° C. at 10° C./min in He As shown in FIG. 5, Nd and Pr are found to have more acid sites than Y and La. Therefore, based on these results, Nd and Pr are considered to have high HC absorbability.

Figure 6:
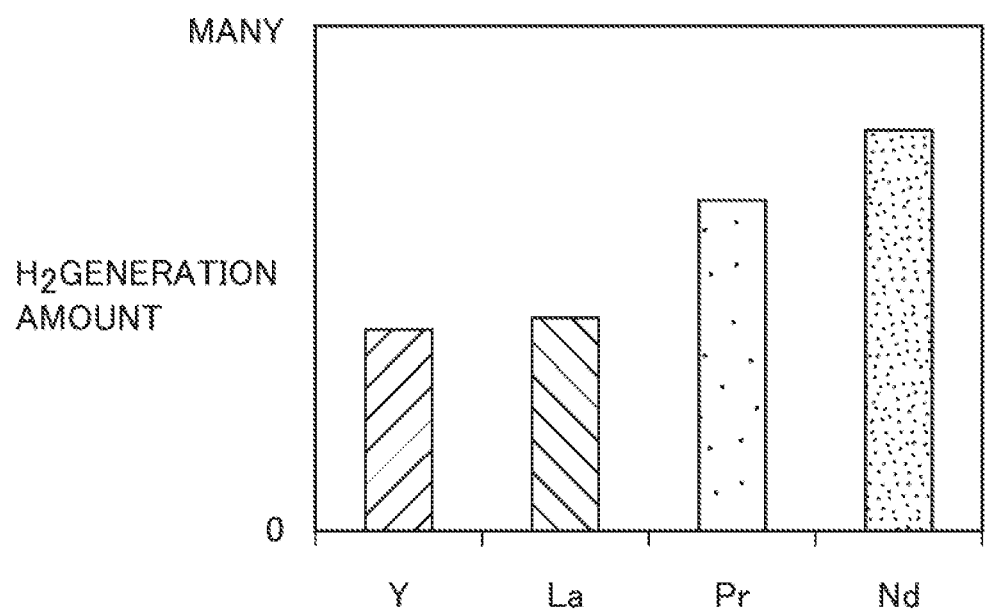
FIG. 6 is a chart showing the hydrogen generation amount by way of the steam-reforming reaction of each complex oxide.

FIG. 6 is a graph comparing the generated amount of hydrogen by the steam reforming reaction at 500° C., in the case of containing each element of Y, La, Pr and Nd in the crystalline structure of CeZr complex oxide. It should be noted that the contents of the respective elements of Y, La, Pr and Nd at this time are 7% by mass, the content of Ce is 41% by mass, and the contents of Zr is 52% by mass. As shown in FIG. 6, Pr and Nd are found to have greater generated amounts of hydrogen than Y and La.

According to the present embodiment, the following effects are exerted. In the present embodiment, in the so-called wall-flow type GPF 32, the TWC 33 loaded on the barrier wall 323 is configured to include a catalytic metal at least containing Rh, and a complex oxide having OSC ability and having Nd and Pr in the crystalline structure. Herein, among elements capable of being incorporated in the crystalline structure of the complex oxide having OSC ability, Nd and Pr have a characteristic of a large amount of acid sites. For this reason, the complex oxide having Nd and Pr in the crystalline structure has high HC absorbability due to the large amount of acid sites, and thus the steam-reforming reaction, which progresses under the existence of HC and water, advances efficiently. Given this, hydrogen is generated by the advancement of this steam-reforming reaction, and the oxide formation of Rh constituting the TWC 33 is suppressed by the generated hydrogen. In other words, since it is possible to avoid a decline in the NOx reducibility of Rh, high NOx purification performance can be exhibited. Therefore, the present embodiment can provide the GPF 32 which can exhibit a more superior three-way purification function than conventionally. In addition, the generated amount of hydrogen by the steam-reforming reaction is higher for Nd than Pr; however, Pr has an effect of absorbing fluctuations in the air/fuel ratio. Therefore, by using the complex oxide having Nd and Pr in the crystalline structure according to the present embodiment, it is possible to exhibit high three-way purification function while suppressing fluctuations in the air/fuel ratio.

In addition, the present embodiment micronizes to make the average pore diameter of the barrier wall 323 at least 15 μm, and make the particle size D90 of the TWC 33 no more than 5 μm. It is thereby possible to introduce the micronized TWC 33 within the pores of the barrier wall 323, and possible to load the TWC 33 on the surfaces inside such pores. Therefore, according to the present embodiment, it is possible to avoid an increase in the pressure loss of the GPF 32 occurring from the TWC 33 being loaded only on the surface of the barrier wall 323, and moreover, possible to exhibit higher three-way purification function.

In addition, with the present embodiment, the TWC 33 is configured to contain Rh and Pd, and is loaded onto the surfaces inside the pores within the barrier wall 323 in a state mixing this Rh and Pd. Conventionally, in the case of mixing Rh and Pd on the GPF 32 as mentioned above, as a result of Ba added to the Pd layer either contacting or being near Rh, the Rh is oxidized to form an oxide by the electron donating action of Ba, whereby the NOx purification performance greatly declines. In contrast, according to the present embodiment, it is possible to avoid a decline in the NOx purification performance of Rh by way of the aforementioned steam-reforming reaction, and thus possible to provide the GPF 32 that can exhibit more superior three-way purification function than conventionally. In addition, since it is difficult to load conventional TWC having a two-layer structure of the Rh layer and Pd layer on the surfaces inside the pores of the barrier wall, and further, high three-way purification function is exhibited in the state mixing Rh and Pd according to the present embodiment, it becomes a catalyst composition preferred in the loading onto the surfaces within pores of the barrier wall 323.

In addition, with the present embodiment, the TWC 33 is configured to be free of Ba. According to the present embodiment, since Ba is not contained in the TWC 33, it is possible to avoid oxide formation of Rh from progressing due to Ba in the aforementioned way, and thus the NOx purification performance from declining.

In addition, with the present embodiment, a configuration is established in which Nd and Pr are contained in at least 10% by mass in the crystalline structure of the complex oxide. More superior three-way purification performance is thereby exhibited.

It should be noted that the present invention is not to be limited to the above-mentioned embodiment, and that modifications, improvements, etc. of a scope that can achieve the objects of the present invention are encompassed by the present invention.

EXAMPLES

Next, although Examples of the present invention will be explained, the present invention is not to be limited to these examples.

Examples 1 to 24, Comparative Examles 1 to 4

TWC, carrier, complex oxide, etc. were prepared by the following sequence in the proportions shown in Table 1. First, a slurry was prepared by adding water-based medium and additives, followed by mixing in a ball mill. Next, the slurry was pulverized by wet pulverization or the like to adjust the particle size. Next, the GPF was immersed in the mixed slurry one time by a dipping method. The loading amount (washcoat amount) was set to 60 g/L (except for Examples 10 to 13). Subsequently, a GPF on which TWC was loaded was obtained by calcining at 700° C. for 2 hours. It should be noted that a honeycomb structure made by NGK (inside diameter 25.4 (φ 1 inch) mm, average pore diameter 20 μm (excluding Examples 8 and 9), wall thickness 8 mil (excluding Examples 17 and 18), cell number 300, material cordierite, volume 15 cc) was used as the GPF.

TABLE 1

| | Contained elements in complex oxide (mass %) | | | | | | | Metal Catalyst | | Added Ba | D90 (μm) | Washcoat amount (g/L) | Average pore diameter (μm) | Wall thickness (mil) |
|---|---|---|---|---|---|---|---|---|---|---|---|---|---|---|
| | Ce | Zr | Y | La | Nd | Pr | Total | | | | | | | |
| Example 1 | 41 | 45 | 0 | 0 | 7 | 7 | 100 | Rh | Pd | None | 3 | 60 | 20 | 8 |
| Example 2 | 41 | 45 | 0 | 0 | 7 | 7 | 100 | Rh | Pd | None | 0.5 | 60 | 20 | 8 |
| Example 3 | 41 | 45 | 0 | 0 | 7 | 7 | 100 | Rh | Pd | None | 1 | 60 | 20 | 8 |
| Example 4 | 41 | 45 | 0 | 0 | 7 | 7 | 100 | Rh | Pd | None | 2.5 | 60 | 20 | 8 |
| Example 5 | 41 | 45 | 0 | 0 | 7 | 7 | 100 | Rh | Pd | None | 3.5 | 60 | 20 | 8 |
| Example 6 | 41 | 45 | 0 | 0 | 7 | 7 | 100 | Rh | Pd | None | 5 | 60 | 20 | 8 |
| Example 7 | 41 | 45 | 0 | 0 | 7 | 7 | 100 | Rh | Pd | None | 8 | 60 | 20 | 8 |
| Example 8 | 41 | 45 | 0 | 0 | 7 | 7 | 100 | Rh | Pd | None | 3 | 60 | 16 | 8 |
| Example 9 | 41 | 45 | 0 | 0 | 7 | 7 | 100 | Rh | Pd | None | 3 | 60 | 23 | 8 |
| Example 10 | 41 | 45 | 0 | 0 | 7 | 7 | 100 | Rh | Pd | None | 3 | 40 | 20 | 8 |
| Example 11 | 41 | 45 | 0 | 0 | 7 | 7 | 100 | Rh | Pd | None | 3 | 54 | 20 | 8 |
| Example 12 | 41 | 45 | 0 | 0 | 7 | 7 | 100 | Rh | Pd | None | 3 | 66 | 20 | 8 |
| Example 13 | 41 | 45 | 0 | 0 | 7 | 7 | 100 | Rh | Pd | None | 3 | 80 | 20 | 8 |
| Example 14 | 41 | 53 | 0 | 0 | 3 | 3 | 100 | Rh | Pd | None | 3 | 60 | 20 | 8 |
| Example 15 | 41 | 47 | 0 | 0 | 6 | 6 | 100 | Rh | Pd | None | 3 | 60 | 20 | 8 |

TABLE 1-continued

| | Contained elements in complex oxide (mass %) | | | | | | | Metal Catalyst | Added Ba | D90 (μm) | Washcoat amount (g/L) | Average pore diameter (μm) | Wall thickness (mil) |
|---|---|---|---|---|---|---|---|---|---|---|---|---|---|
| | Ce | Zr | Y | La | Nd | Pr | Total | | | | | | |
| Example 16 | 41 | 43 | 0 | 0 | 8 | 8 | 100 | Rh Pd | None | 3 | 60 | 20 | 8 |
| Example 17 | 41 | 45 | 0 | 0 | 7 | 7 | 100 | Rh Pd | None | 3 | 60 | 20 | 6.5 |
| Example 18 | 41 | 45 | 0 | 0 | 7 | 7 | 100 | Rh Pd | None | 3 | 60 | 20 | 10 |
| Example 19 | 41 | 45 | 0 | 0 | 7 | 7 | 100 | Rh — | None | 3 | 60 | 20 | 8 |
| Example 20 | 41 | 45 | 0 | 0 | 7 | 7 | 100 | Rh Pd | Ba(Solid) | 3 | 60 | 20 | 8 |
| Example 21 | 41 | 45 | 0 | 0 | 7 | 7 | 100 | Rh Pd | Ba(Liquid) | 3 | 60 | 20 | 8 |
| Comparative Example 1 | 41 | 45 | 7 | 7 | 0 | 0 | 100 | Rh Pd | None | 3 | 60 | 20 | 8 |
| Comparative Example 2 | 41 | 52 | 0 | 0 | 7 | 0 | 100 | Rh Pd | None | 3 | 60 | 20 | 8 |
| Comparative Example 3 | 41 | 52 | 0 | 0 | 0 | 7 | 100 | Rh Pd | None | 3 | 60 | 20 | 8 |
| Comparative Example 4 | 30 | 70 | 0 | 0 | 0 | 0 | 100 | Rh Pd | None | 3 | 60 | 20 | 8 |

<NOx Purification Performance>

Figure 7:
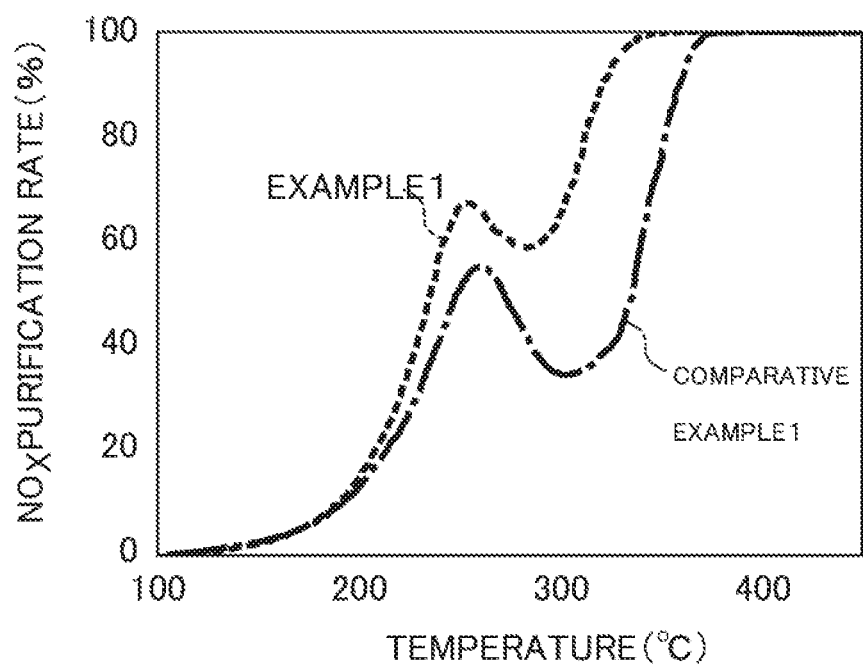
FIG. 7 is a graph showing the relationship between the temperature and NOx purification rates for Example 1 and Comparative Example 1.

FIG. 7 is a graph showing the relationship between temperature and NOx purification rate for Example 1 and Comparative Example 1. More specifically, it is a graph showing, with regards to Example 1 which adds Nd and Pr to the OSC material, and Comparative Example 1 which adds Y and La thereto, the results of evaluating the NOx purification performance of the GPF according to the following conditions. As shown in FIG. 7, it was found that the purification of NOx progressed at lower temperatures for Example 1 than Comparative Example 1. From these results, it was confirmed that Example 1 in which Nd and Pr are added to the OSC material in the GPF had improved NOx purification performance compared to Comparative Example 1 in which Y and La are added thereto.

(NOx Purification Performance Evaluation Conditions)

The NOx purification performance was evaluated by measuring the NOx concentration when heating the GPF at 20° C./min up to 500° C. in stoichiometric gas.

<Air/fuel Ratio Absorbance>

Figure 8:
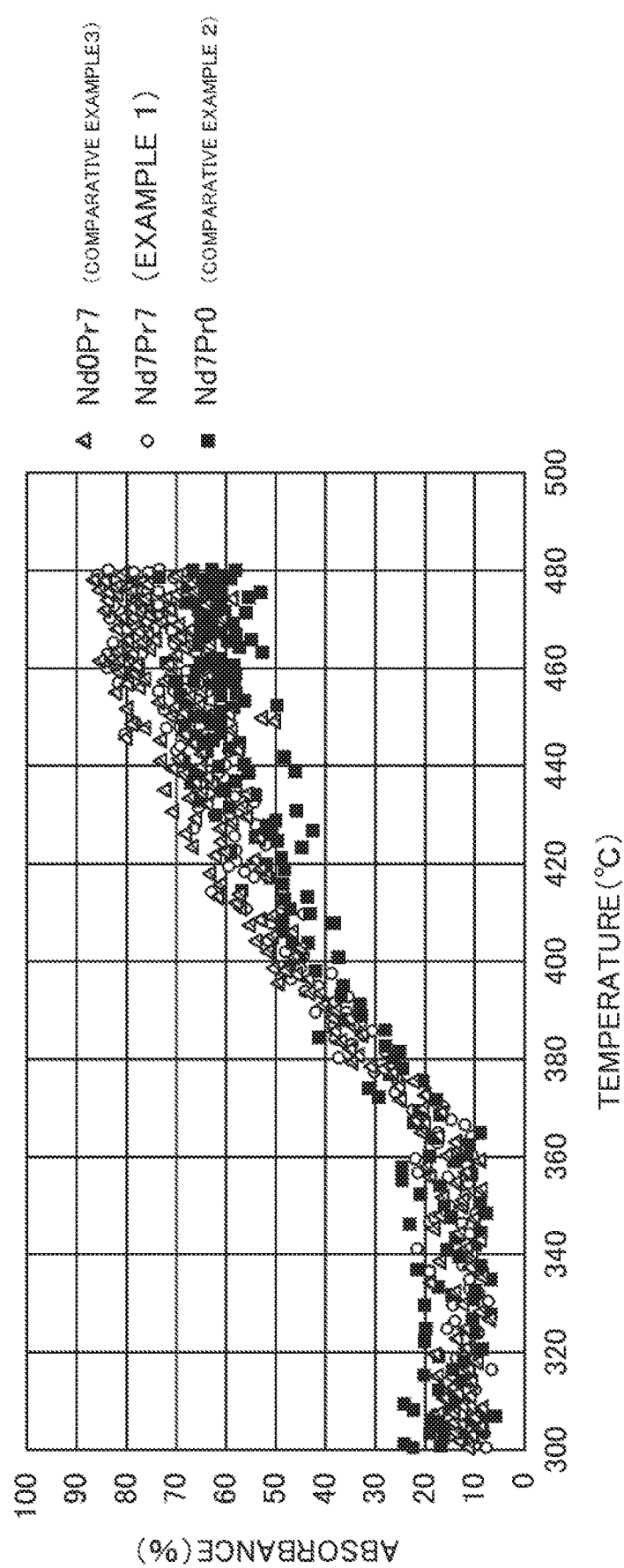
FIG. 8 is a graph showing the relationship between the temperature and air/fuel ratio absorbance for Example 1 and Comparative Examples 2 and 3.

FIG. 8 is a graph showing the relationship between the temperature and air/fuel ratio absorbance of Example 1 and Comparative Examples 2 and 3. More specifically, it is a graph showing the results of measuring the air/fuel ratio absorbance of the GPF for each of Comparative Example 2 in which only Nd is added to the OSC material, Comparative Example 3 in which only Pr is added thereto, and Example 1 which uses both Nd and Pr. The air/fuel ratio absorbance was calculated using Formula (1) according to the following conditions. Air/fuel ratio absorbance (%)=((air/fuel ratio amplitude (IN)−air/fuel ratio amplitude (OUT))/air/fuel ratio amplitude (IN))×100
Formula (1)

(In Formula (1), "air/fuel ratio amplitude (IN)" indicates the air/fuel ratio amplitude prior to passing through the OSC material, and "air/fuel ratio amplitude (OUT)" indicates the air/fuel ratio amplitude after passing through the OSC material.

(Air/Fuel Ratio Absorbance Measurement Conditions)

Using an actual engine, the air/fuel ratio was amplified to 14.5+/−1.0 (1 Hz), and the air/fuel ratio absorbance was measured when heating at 30° C./min.

As shown in FIG. 8, it was found that Example 1 and Comparative Example 3 have higher air/fuel ratio absorbance compared to Comparative Example 2. Based on these results, it was confirmed that the GPF in which Pr was added to the OSC material could suppress fluctuations in air/fuel ratio, and tends to keep the air/fuel ratio at a stoichiometric ratio.

<D90>

Figure 9:
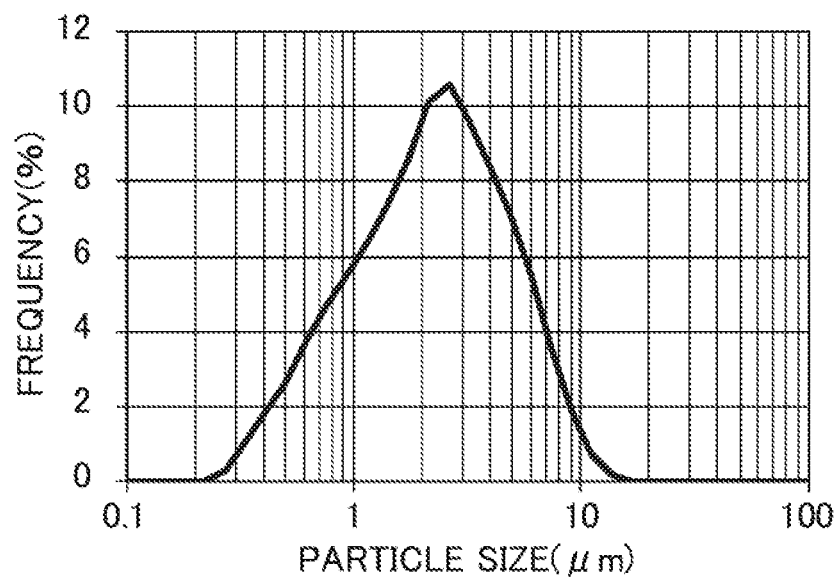
FIG. 9 is a graph showing the particle size distribution of TWC for Example 6.

FIG. 9 is a graph showing the particle size distribution of TWC for Example 6. As shown in FIG. 9, it was confirmed that the D90 of TWC particles become no more than 5 μm. It should be noted that the particle size distribution was measured according to the following measurement conditions similarly for other Examples and Comparative Examples. The obtained D90 were as shown in Table 1.

(Particle Size Distribution Measurement Conditions)

Instrument: Laser diffraction particle size distribution analyzer (SALD-3100, manufactured by Shimadzu). Measurement Method: Laser scattering method <Loading State>

Figure 10:
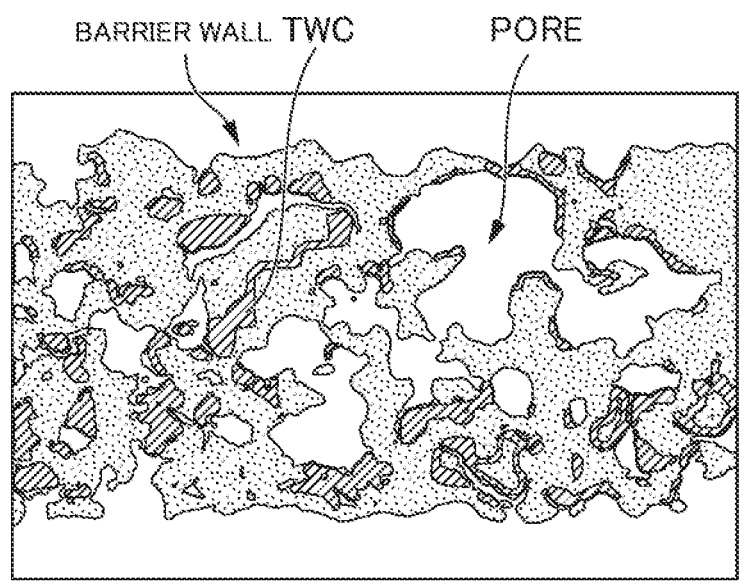
FIG. 10 is a graph showing the loading state of TWC within barrier walls of the GPF of Example 1.

FIG. 10 is a view showing the loading state of TWC within the barrier wall of the GPF of Example 1. More specifically, it is a mapping obtained by conducting cross-sectional SEM observation and elemental analysis by EPMA according to the following conditions on the loading state of TWC within the barrier wall of the GPF according to Example 1. Based on these results, it was confirmed that, in the case of the average pore diameter of the barrier wall being at least 15 μm, and the D90 of TWC being no more than particle size 5 μm, the TWC was uniformly loaded within the barrier wall. It should be noted that it was confirmed that, also for other Examples in which the particle size of TWC was no more than 5 μm, TWC was similarly loaded uniformly within the barrier wall.

(EPMA Measurement Conditions)

Instrument: Electron probe micro analyzer (JXA-8100, manufactured by JEOL). Measurement conditions: acceleration voltage 15 KV, illumination current 0.05 pA, pixel size 1 μm, data collection time per 1 cell: 38 ms, beam width 0.7 μm <Relationship between D90 and Pressure Loss>

Figure 11:
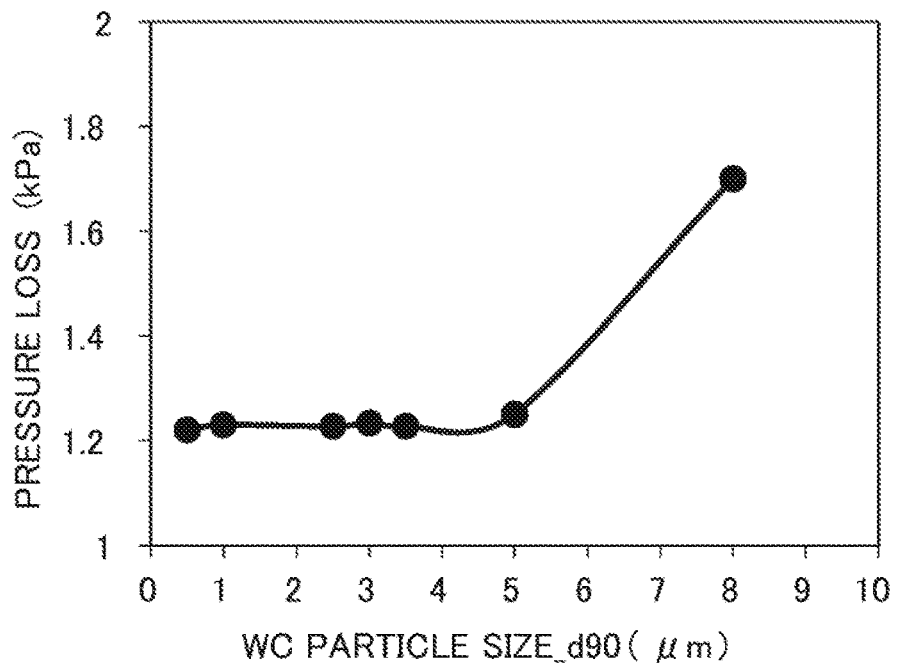
FIG. 11 is a graph showing the relationship between D90 of TWC and pressure loss for Examples 1 to 7.

FIG. 11 is a graph showing the relationship between D90 of the TWC loaded on the GPFs of Examples 1 to 7 and pressure loss. As shown in FIG. 11, it was found that Examples 1 to 6, which have D90 of no more than 5 μm, stayed at a low level at which pressure loss was substantially constant; whereas, the pressure loss increases when the D90 exceeded 5 μm as in the GPF of Example 7 having D90 of 8 μm. Based on these results, it was confirmed that it was preferable for the D90 of the TWC loaded on the GPF to be no more than 5 μm.

<Relationship between Average pore diameter and Pressure Loss>

Figure 12:
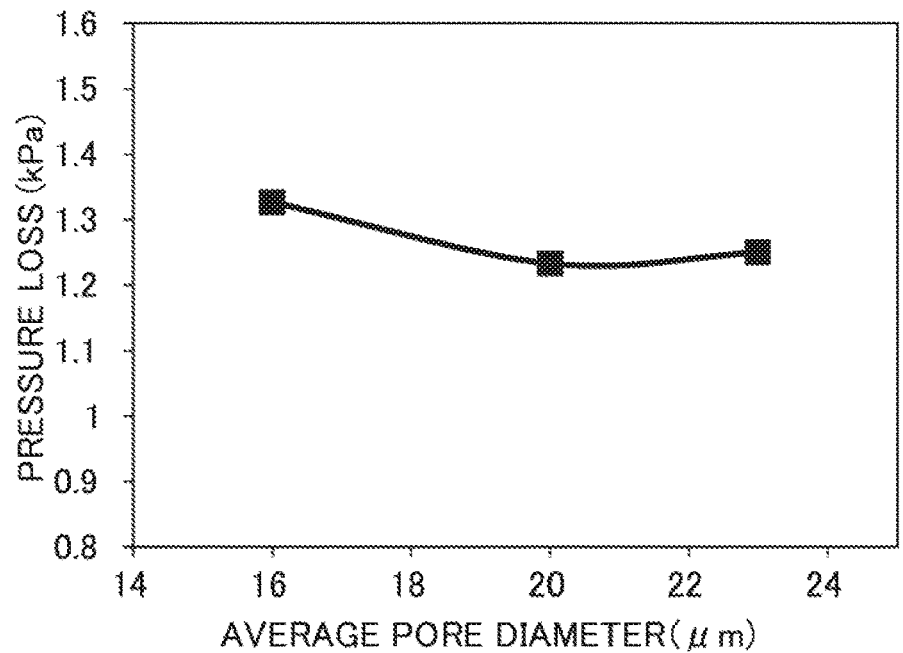
FIG. 12 is a graph showing the relationship between average pore diameter of the barrier wall of the GPF and pressure loss for Example 1, and Examples 8 and 9.

FIG. 12 is a graph showing the relationship between the average pore diameter of the barrier wall of the GPFs of Examples 1, 8 and 9, and pressure loss. As shown in FIG. 12, it was found that, although the pressure loss somewhat increases as the average pore diameter becomes smaller, the pressure loss stayed at a low level. Based on these results, it was confirmed that it is preferable for the average pore diameter of the GPF to be at least 5 µm.

<Relationship between Washcoat (WC) Amount and Pressure Loss>

Figure 13:
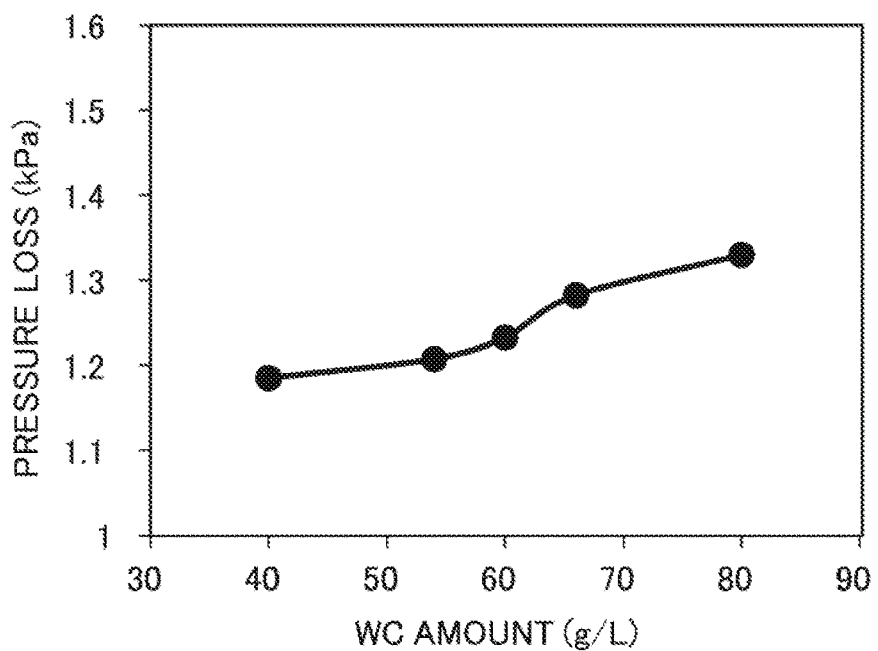
FIG. 13 is a graph showing the relationship between the washcoat amount of TWC and pressure loss for Example 1 and Examples 10 to 13.

FIG. 13 is a graph showing the relationship between the washcoat amount of TWC for Examples 1 and 10 to 13, and the pressure loss. As shown in FIG. 13, it was found that, although the pressure loss increased as the washcoat amount increased, the pressure loss of the GPF of Example 13 having a washcoat amount of 80 g/L stayed at a low level. Based on these results, it was confirmed that the washcoat amount of TWC is preferably no more than 80 g/L.

<Relationship between Wall Thickness and Pressure Loss>

Figure 14:
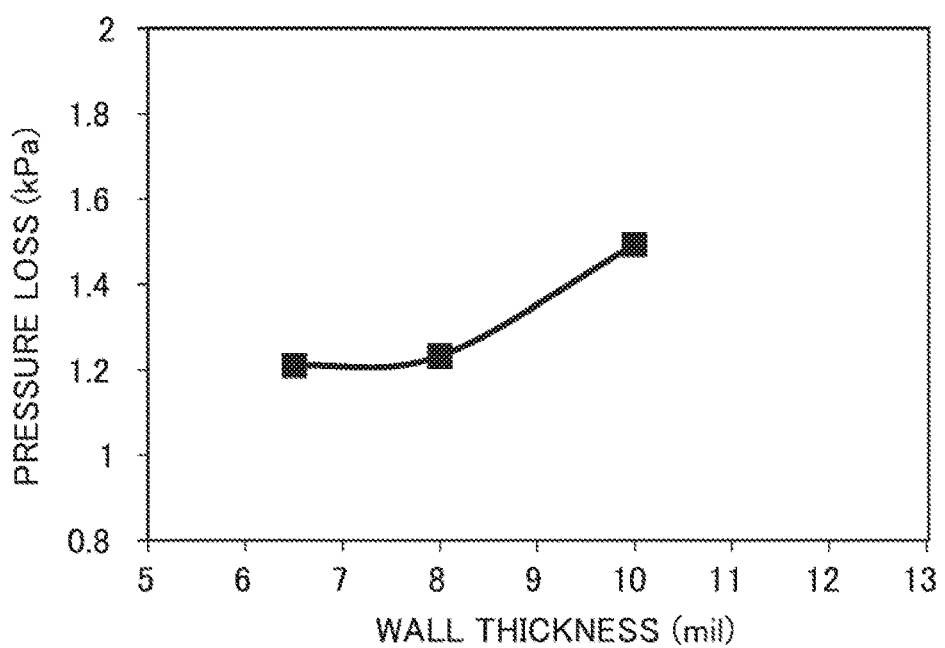
FIG. 14 is a graph showing the relationship between wall thickness of the GPF and pressure loss for Example 1 and Examples 17 and 18.

FIG. 14 is a graph showing the relationship between wall thickness of the GPFs of Examples 1, 17 and 18, and pressure loss. As shown in FIG. 14, it was found that, although the pressure loss increased as the wall thickness increased, the pressure loss of the GPF of Example 18 having a wall thickness of 10 mil stayed at a low level. Based on these results, it was confirmed that the wall thickness of the GPF was preferably no more than 10 mil.

<Purification Performance according to Presence of Pd>

Figure 15A:
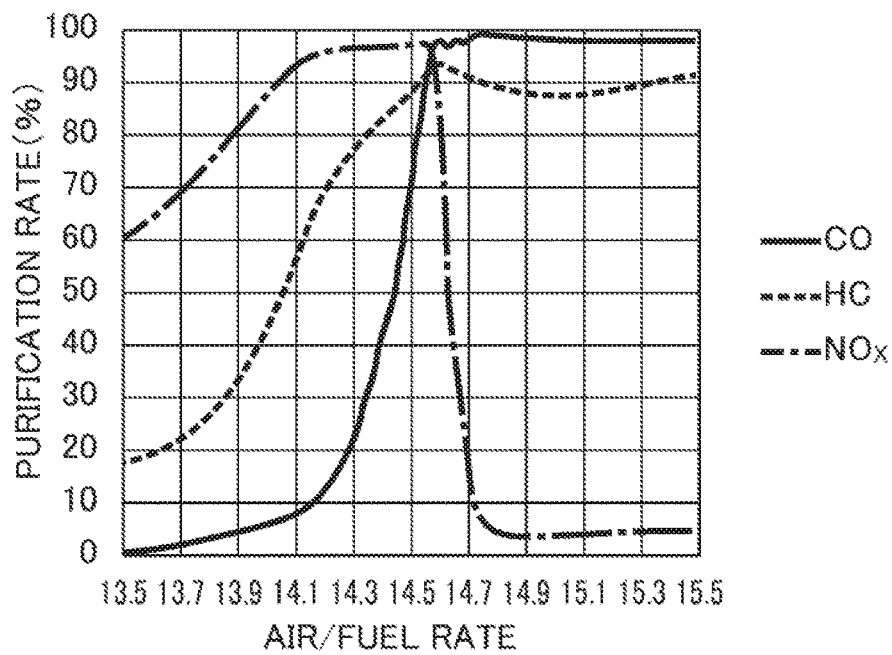
FIG. 15A is a graph showing the relationship between the air/fuel ratio and purification rate of the GPF for Example 1.
Figure 15B:
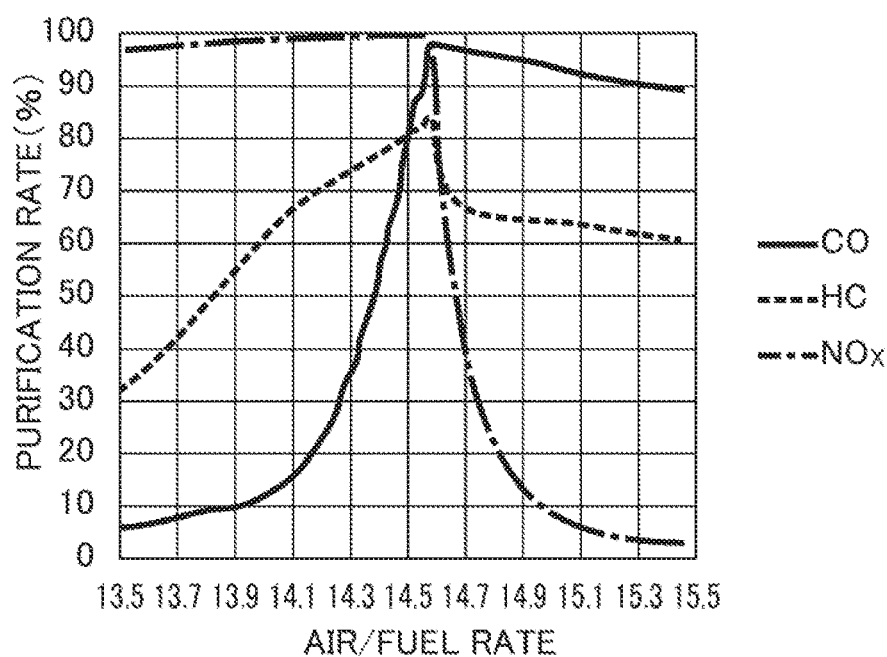
FIG. 15B is a graph showing the relationship between the air/fuel ratio and purification rate of the GPF for Example 19.

FIG. 15A and FIG. 15B are graphs showing the relationship between the air/fuel ratio at the GPFs of Examples 1 and 19, and the purification rates for CO, HC and NOx, respectively. In the graphs, the vertical axis indicates the purification rates of CO, HC and NOx, respectively, and the horizontal axis indicates the air/fuel ratio which is the ratio of air to fuel. It should be noted that stoichiometric ratio indicates a range in which the air/fuel ratio is approximately 14.5. Rh and Pd are contained in the TWC loaded on the GPF of Example 1, and only Rh is contained in the TWC loaded on the GPF of Example 19. Evaluation conditions were set according to the following conditions. Based on the evaluation results of FIG. 15A and FIG. 15B, it was found that, compared with the GPF of Example 1 in which Rh and Pd are contained, the GPF of Example 19 in which only Rh is contained had lower HC purification rate in the range in which the air/fuel ratio is higher than a stoichiometric ratio. Based on these results, it was confirmed that, compared with Example 19 which solely uses Rh as the TWC loaded on the GPF, Example 1 which jointly uses Rh and Pd had higher three-way purification performance.

(HC, CO, NOx purification Performance Evaluation Conditions)

Using an actual engine, the air/fuel ratio was continuously varied for 20 minutes from 13.5 to 15.5 at a catalyst inlet temperature of 500° C., and the purification rates for HC, CO and NOx were measured.

<Purification Performance according to Presence of Ba>

Figure 15C:
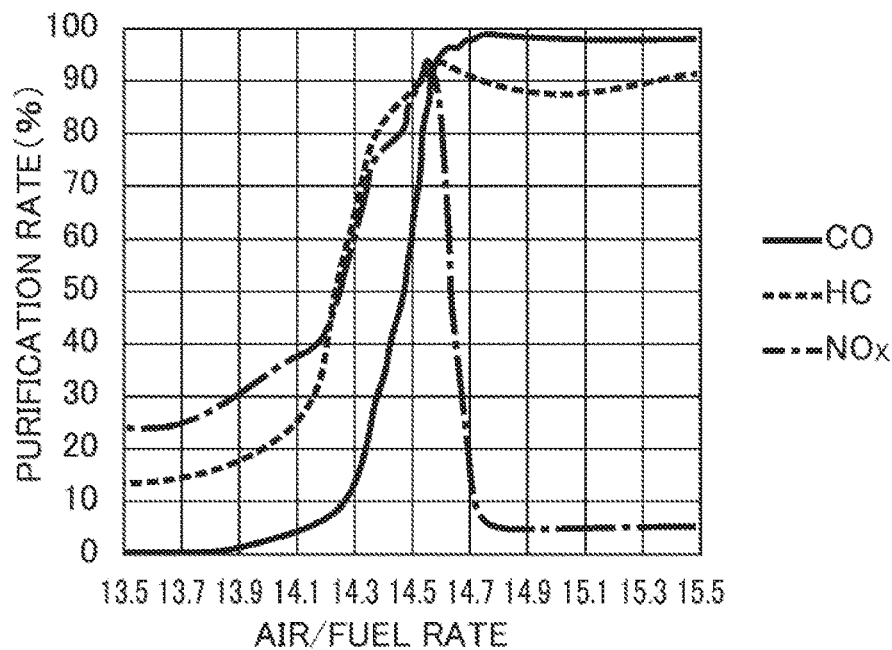
FIG. 15C is a graph showing the relationship between the air/fuel ratio and purification rate of the GPF for Example 20.
Figure 15D:
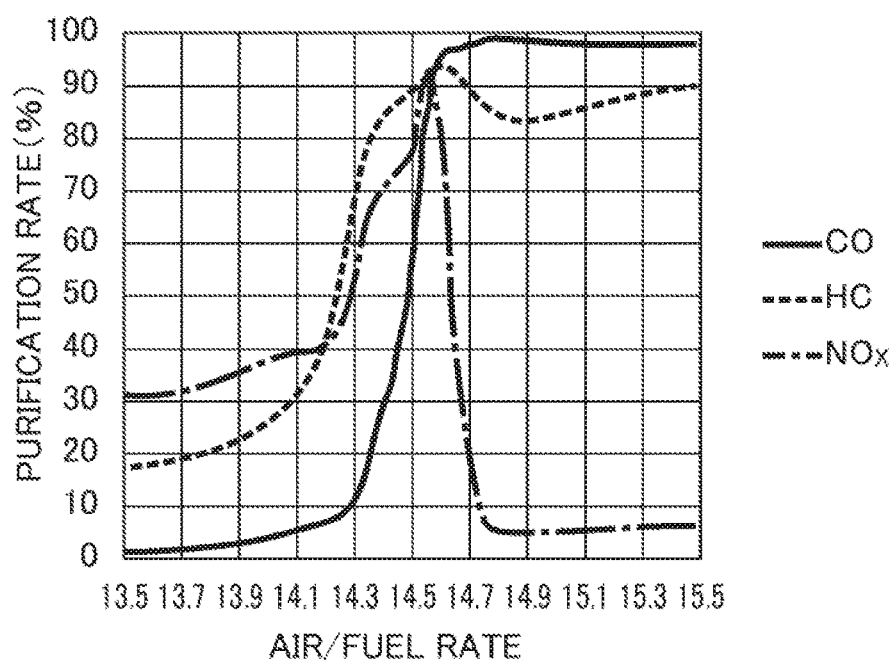
FIG. 15D is a graph showing the relationship between the air/fuel ratio and purification rate of the GPF for Example 21.

FIG. 15C and FIG. 15D are graphs showing the relationship between the air/fuel ratio at the GPFs of Example 20 and Example 21, and the purification rates for CO, HC and NOx, respectively. Solid Ba (Ba sulfate) is contained along with Rh and Pd in the TWC loaded on the GPF of Example 20, and liquid Ba (Ba acetate and Ba nitrate) is contained along with Rh and Pd in the TWC loaded on the GPF of Example 21. In addition, although Rh and Pd are contained in the TWC loaded on the GPF of Example 1 (FIG. 15A) described earlier, Ba is not contained. Refer to this for comparison. Regarding the evaluation conditions, evaluation was performed at similar conditions to the abovementioned HC, CO and NOx purification performance evaluation conditions. Based on the evaluation results in FIG. 15A, FIG. 15C and FIG. 15D, it was found that the GPFs of Examples 20 and 21 containing solid Ba or liquid Ba had low NOx purification rate in the region in which the air/fuel ratio was lower than a stoichiometric ratio, compared to the GPF of Example 1 which was free of Ba. Based on these results, it was confirmed that Example 1 in which Ba is not contained in the TWC loaded on the GPF has higher exhaust purification performance compared to Example 20 and Example 21 in which Ba is contained.

<Purification Performance according to Differences in Total Content of Nd and Pd>

Figure 16A:
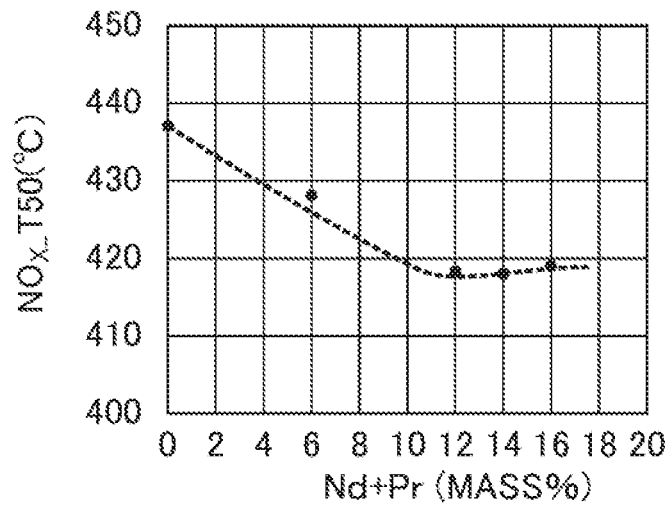
FIG. 16A is a graph showing the relationship between the total content of Nd and Pr and the $NO_x\_T50$.
Figure 16B:
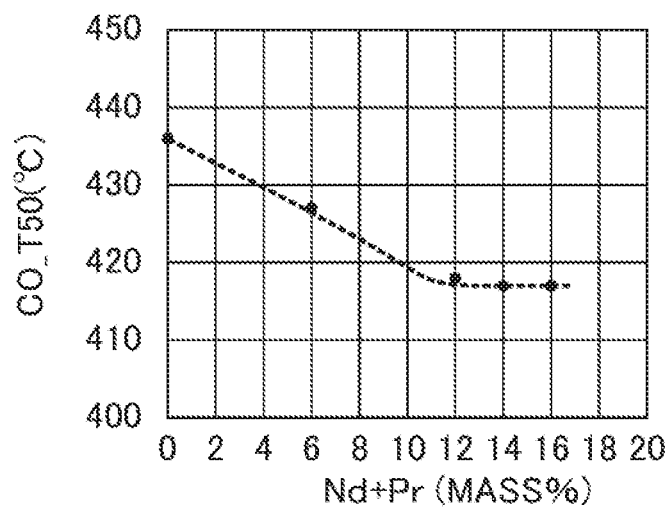
FIG. 16B is a graph showing the relationship between the total content of Nd and Pr and the CO_T50.
Figure 16C:
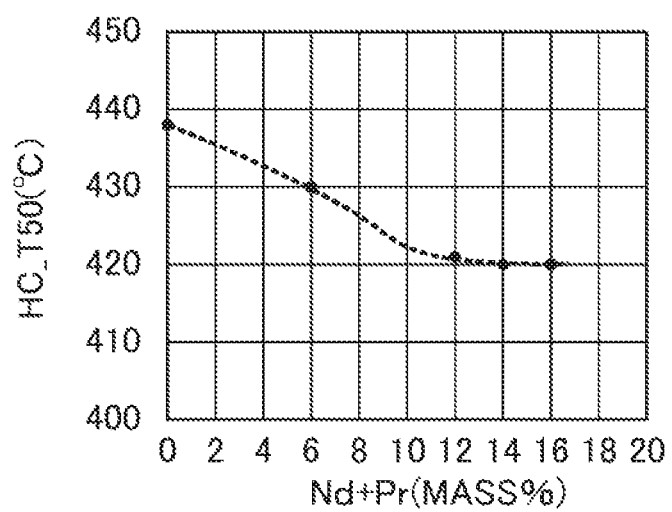
FIG. 16C is a graph showing the relationship between the total content of Nd and Pr and the HC_T50.

FIG. 16A to FIG. 16C are graphs showing the relationships between the total content of Nd and Pr contained in the GPFs of Example 1, Example 14, Example 15, Example 16 and Comparative Example 4, and the NOx_T50, CO_T50 and HC_T50, respectively. NOx_T50, CO_T50 and HC_T50 indicate the temperatures at which 50% of the CO, HC and NOx are purified, respectively, and are shown on the vertical axis in the graphs. The horizontal axis shows the total content (mass %) of Nd and Pr in the complex oxide. The total content of Nd and Pr are 0, 6, 12, 14 and 16% by mass in order of Comparative Example 4, Example 14, Example 15, Example 1 and Example 16. As shown in FIG. 16A to FIG. 16C, it was found that the GPFs of Example 1, Example 14, Example 15 and Example 16 purified NOx, CO and HC at lower temperatures relative to Comparative Example 4. Therefore, it was confirmed that, to exhibit the three-way purification function in the GPF of the present embodiment, it is preferable for the total content of Nd and Pr to be 10% by mass to 20% by mass, and it was more preferable if 12% by mass to 16% by mass.

EXPLANATION OF REFERENCE NUMERALS

1 engine (internal combustion engine)
2 exhaust purification device
3 exhaust pipe (exhaust passage)
32 GPF (exhaust purification filter)
32$a$ inlet-side end face
32$b$ outlet-side end face
33, 33$a$, 33$b$ TWC (three-way catalyst)
320 filter substrate
323 barrier wall
321 inlet-side cell (cell)
322 outlet-side cell (cell)
324 inlet-side sealed part
325 outlet-side sealed part

The invention claimed is:

1. An exhaust purification filter which is provided in an exhaust passage of a gasoline engine, and purifies by capturing particulate matter in exhaust gas of the gasoline engine, the exhaust purification filter comprising:
    a filter substrate in which a plurality of cells extending from an inlet-side end face until an outlet-side end face of exhaust gas are formed to be divided by porous barrier walls, and an opening at the inlet-side end face and an opening at the outlet-side end face of the cells are alternately sealed; and
    a three-way catalyst that is loaded on the barrier walls, wherein the three-way catalyst is configured to include a catalytic metal containing at least Rh, and a CeZrNdPr complex oxide having an oxygen occlusion/release ability, and wherein total content of Nd and Pr contained in the complex oxide is 12% by mass to 16% by mass.

2. The exhaust purification filter according to claim 1, wherein the barrier wall has an average pore diameter of at least 15 μm, and wherein the three-way catalyst has a particle size D90 when a cumulative distribution from a small particle size side of the particle distribution is 90% of no more than 5 μm.

3. The exhaust purification filter according to claim 1, wherein the three-way catalyst contains Rh and Pd as the catalytic metal, and is loaded onto surfaces within pores inside of the barrier wall in a state in which the Rh and Pd are mixed.

4. The exhaust purification filter according to claim 1, wherein the three-way catalyst is configured to be free of Ba.

5. The exhaust purification filter according to claim 1, wherein the complex oxide contains only Ce, Zr, Nd, and Pr.

6. The exhaust purification filter according to claim 2, wherein the three-way catalyst contains Rh and Pd as the catalytic metal, and is loaded onto surfaces within pores inside of the barrier wall in a state in which the Rh and Pd are mixed.

7. The exhaust purification filter according to claim 2, wherein the three-way catalyst is configured to be free of Ba.

8. The exhaust purification filter according to claim 3, wherein the three-way catalyst is configured to be free of Ba.

9. The exhaust purification filter according to claim 6, wherein the three-way catalyst is configured to be free of Ba.

* * * * *